(12) United States Patent
Mendoza et al.

(10) Patent No.: US 8,075,049 B2
(45) Date of Patent: Dec. 13, 2011

(54) STIFFENING DEVICE FOR A MOTOR VEHICLE

(75) Inventors: Boris Suaznabar Mendoza, Bietigheim (DE); Heiko Teichmann, Weil Im Schönbuch (DE); Ursula Schäf, Markgroeningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 227 days.

(21) Appl. No.: 12/471,828

(22) Filed: May 26, 2009

(65) Prior Publication Data

US 2010/0026046 A1   Feb. 4, 2010

(30) Foreign Application Priority Data

Aug. 4, 2008   (DE) .......................... 10 2008 036 335

(51) Int. Cl.
*B62D 25/20* (2006.01)
(52) U.S. Cl. ............... 296/204; 296/193.07; 296/187.12
(58) Field of Classification Search .................. 296/204, 296/187.12, 203.01, 203.03, 65.01, 193.07
See application file for complete search history.

(56) References Cited

U.S. PATENT DOCUMENTS

| | | | |
|---|---|---|---|
| 4,514,008 A * | 4/1985 | Watanabe et al. | 296/204 |
| 6,491,337 B2 | 12/2002 | Averdick et al. | |
| 2006/0055207 A1 | 3/2006 | Reinhardt | |
| 2007/0273179 A1 * | 11/2007 | Hommel et al. | 296/204 |
| 2008/0007089 A1 | 1/2008 | Bachmann | |

FOREIGN PATENT DOCUMENTS

| | | |
|---|---|---|
| DE | 10005245 A1 | 8/2001 |
| DE | 10335541 A1 | 3/2005 |
| DE | 102004026299 A1 | 12/2005 |
| DE | 102005016994 A1 | 10/2006 |
| DE | 102006031452 A1 | 1/2008 |
| DE | 102006044799 A1 | 4/2008 |
| JP | 6144300 A | 5/1994 |
| JP | 2003205870 A | 7/2003 |
| JP | 2004155350 A | 6/2004 |
| JP | 2005199788 A | 7/2005 |
| JP | 2008105529 A | 5/2008 |

OTHER PUBLICATIONS

German Search Report dated Apr. 30, 2009.

* cited by examiner

*Primary Examiner* — Dennis Pedder

(57) ABSTRACT

A stiffening device for a motor vehicle body with a U-shaped central tunnel. The stiffening device includes a tunnel bridge with at least two transverse beams and, connected thereto, longitudinal beams. The transverse beams extend underneath the central tunnel and can be fastened with a free end in each case to the vehicle body by connecting devices.

8 Claims, 5 Drawing Sheets

STIFFENING DEVICE FOR A MOTOR VEHICLE

CROSS-REFERENCE TO RELATED APPLICATION

This application claims the priority, under 35 U.S.C. §119, of German patent application DE 10 2008 036 335.9, filed Aug. 4, 2008; the prior application is herewith incorporated by reference in its entirety.

BACKGROUND OF THE INVENTION

Field of the Invention

The invention lies in the automotive field. More specifically, the invention relates to a stiffening device for a vehicle body, having a central tunnel, which has a U-shaped profile in cross section, of a motor vehicle. The central tunnel is connected by way of bent portions on lateral limb walls to a floor panel of the vehicle body and, at both sides of the central tunnel, transverse beams or transverse seat carriers are arranged and connected to the floor panel and/or to the central tunnel.

U.S. Pat. No. 6,491,337 B2 and its German counterpart, published patent application DE 100 05 245 A1, describe a vehicle body for a motor vehicle, which vehicle body comprises a floor structure that comprises a floor arrangement with a transverse seat carrier and a transverse bridge arranged between the tunnel side walls in the central tunnel.

SUMMARY OF THE INVENTION

It is accordingly an object of the invention to provide a stiffening element for a vehicle body which overcomes the disadvantages of the heretofore-known devices and methods of this general type and by means of which targeted reinforcement of the vehicle body, in particular in the region of the central tunnel, is ensured in the event of a crash.

With the foregoing and other objects in view there is provided, in accordance with the invention, a stiffening device for a vehicle body of a motor vehicle, the vehicle body having a central tunnel with a U-shaped cross section and with sidewalls, wherein the central tunnel is connected by way of bent portions on the sidewalls to a floor panel of the vehicle body and wherein transverse beams or transverse seat carriers are disposed on both sides of the central tunnel and connected to the floor panel and/or to the central tunnel. The stiffening device comprises:
 a tunnel bridge disposed at an underside of the vehicle body facing toward the floor panel;
 said tunnel bridge including at least two transverse beams and longitudinal beams connected to said transverse beams;
 said transverse beams extending underneath the bent portions of the central tunnel in a vehicle transverse direction and having free ends to be fastened in each case to the vehicle body by connectors disposed in bores.

The main advantages obtained by means of the invention are that reinforcement in the longitudinal and transverse direction is obtained primarily in the region of the B pillar of the vehicle body and in an adjoining vehicle body region situated farther toward the rear. This is achieved in that the central tunnel has, on its underside facing toward the floor panel of the vehicle body, a tunnel bridge which comprises at least two transverse beams and, connected thereto, longitudinal beams, wherein the transverse beams extend under bent portions of the central tunnel in the vehicle transverse direction and can be fastened with a free end in each case to the vehicle body by connecting means. In particular, the tunnel bridge is arranged at the rear end of the central tunnel—as viewed in relation to the direction of travel—with a connection to a transversely aligned heel panel carrier.

In accordance with an added feature of the invention, the forward transverse beam of the tunnel bridge is arranged between transverse seat carriers for front seats in the region of a B pillar and the rearward transverse beam, which is situated further toward the rear, of the tunnel bridge is arranged between transverse seat carriers of rear seats or directly in front of the heel panel carrier.

As a result of the layout, configuration, and arrangement of the tunnel bridge, a strength bond or a nodal point is created which, in the event of a front-on crash and in the event of a side-on crash, in particular in the event of a side-on collision in the region of the B pillar of the vehicle body, generates energy absorption which could not be obtained without reinforcement of the central tunnel.

It is in particular provided according to the invention that the two transverse beams bridge an open region of the central tunnel, with the longitudinal beams being arranged, spaced apart from one another, within the open region of the central tunnel. The transverse beams are for example composed of a hollow, profiled extruded profile and have, on the outside, receptacles for end sides, which correspond thereto, of the longitudinal beams, which longitudinal beams can be connected to the transverse beams by way of a cohesive connection (e.g., weld, solder, brazing, gluing). The transverse beams are therefore arranged, in effect, between the transverse seat carriers which are arranged at both sides of the central tunnel, such that the downwardly open central tunnel cannot be compressed in the event of a side-on crash, and the side-on crash force is transmitted to, and is concomitantly supported by, the opposite transverse seat carrier. The transverse beams of the tunnel bridge have, as profiled hollow beams, a high section modulus, such that bending or folding under the action of side forces can be prevented. The longitudinal beams are arranged so as to lie freely in the central tunnel, that is to say without a direct connection, such that occuring longitudinal forces can be introduced directly into the rear or forward transverse beam, depending on the force which acts.

According to a further additional refinement of the invention, the rear transverse beam has, on its upper side, impact elements which can be arranged as an extension of the longitudinal beams and which are supported in each case with a vertical support wall against the inside of the limb walls of the central tunnel. The impact elements are in particular of triangular design in cross section, and a fastening wall extends at right angles to the support wall, which fastening wall is connected to the transverse beam. Said impact elements project into the central tunnel and are designed to support the side walls of the central tunnel at the free end in the event of a side force.

As a result of the design and arrangement of the tunnel bridge, a positively-guided force flow with targeted energy absorption is advantageously obtained via the transverse beams and the longitudinal beams both in the event of a side-on crash and also in the event of a longitudinal or front-on crash.

Other features which are considered as characteristic for the invention are set forth in the appended claims.

Although the invention is illustrated and described herein as embodied in a stiffening device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
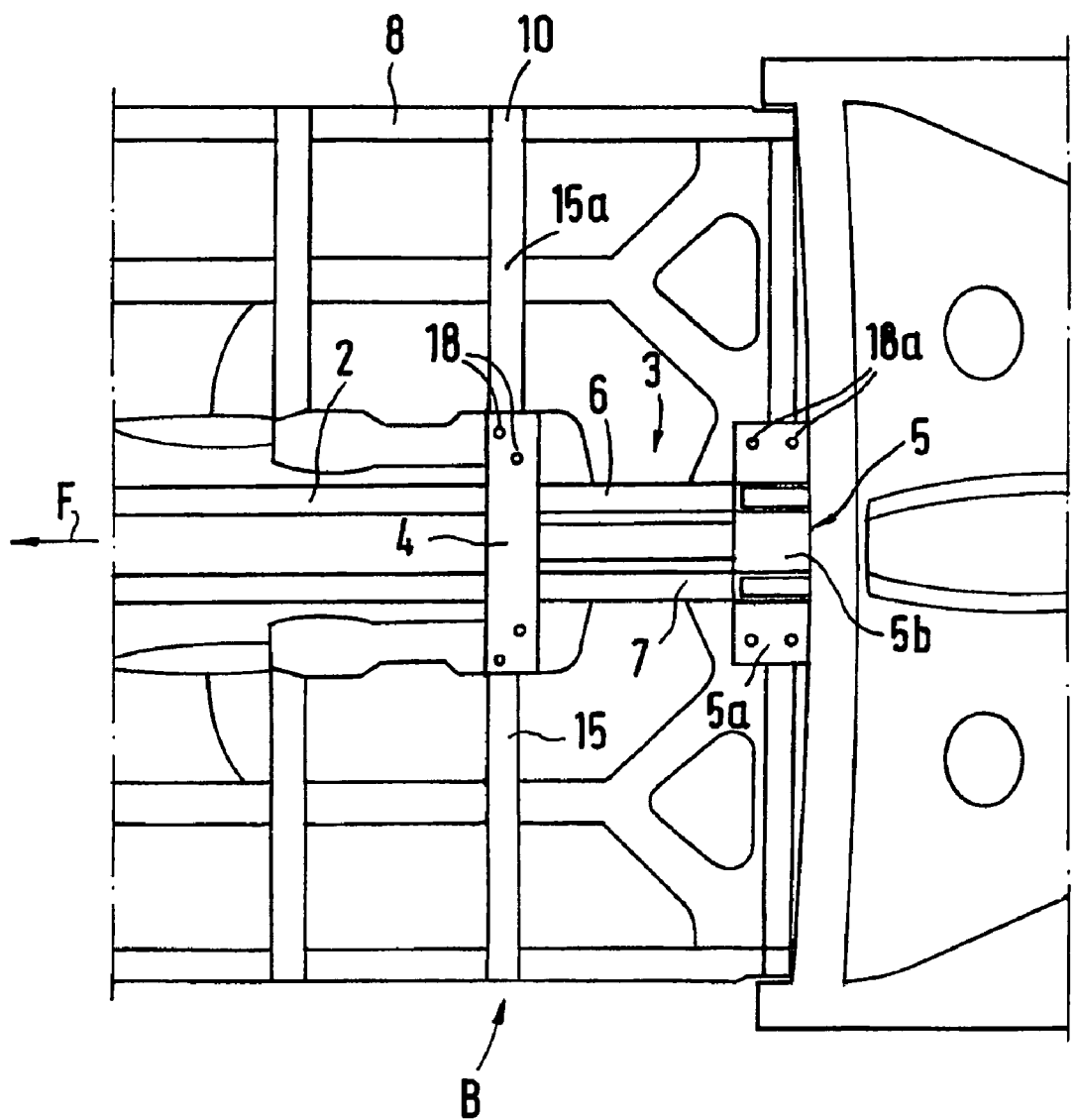
FIG. 1 shows a plan view of a tunnel bridge in the floor region of a motor vehicle below a central tunnel.
Figure 2:
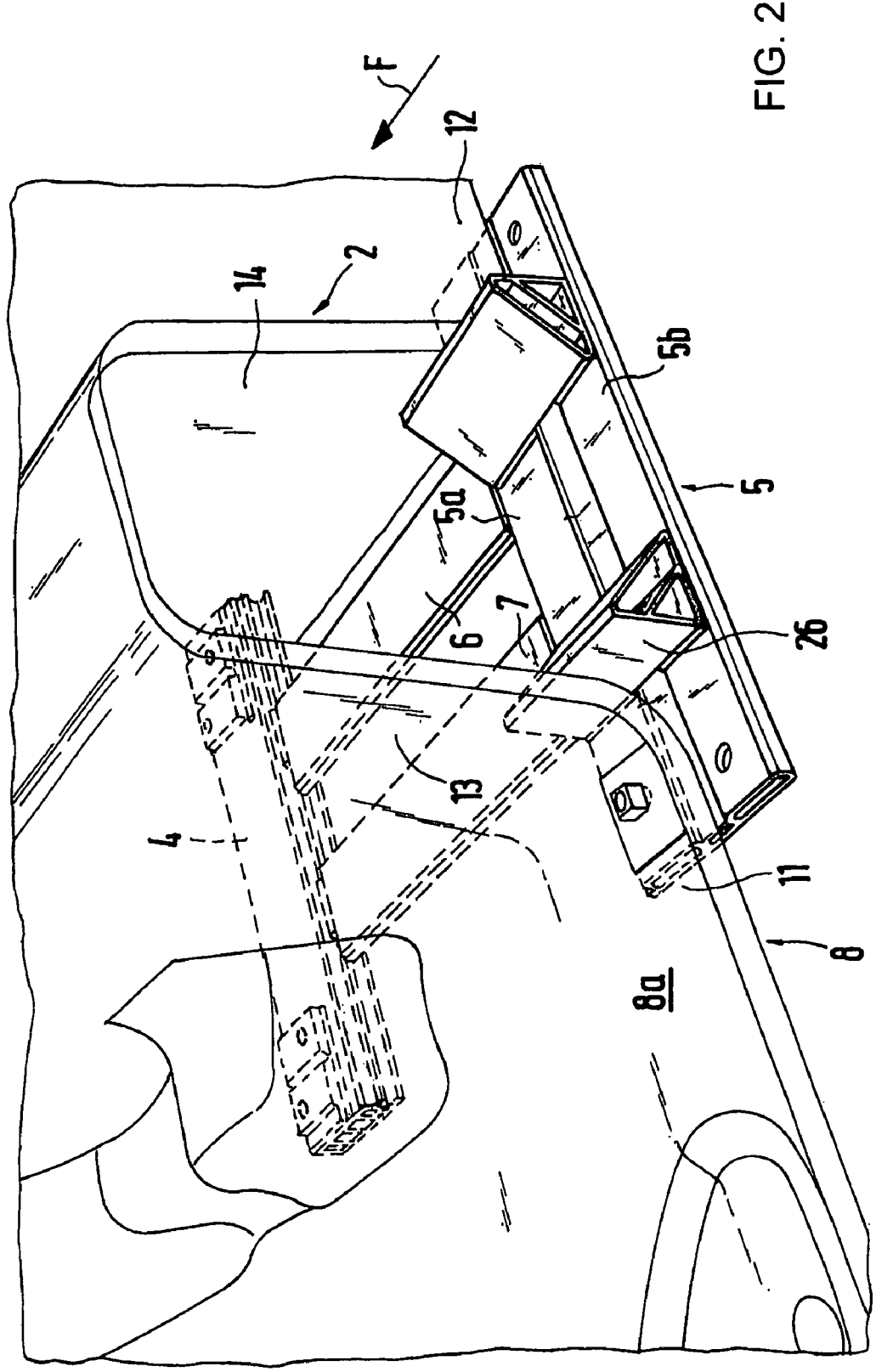
FIG. 2 shows a diagrammatic illustration of a tunnel bridge in connection with the central tunnel.
Figure 3:
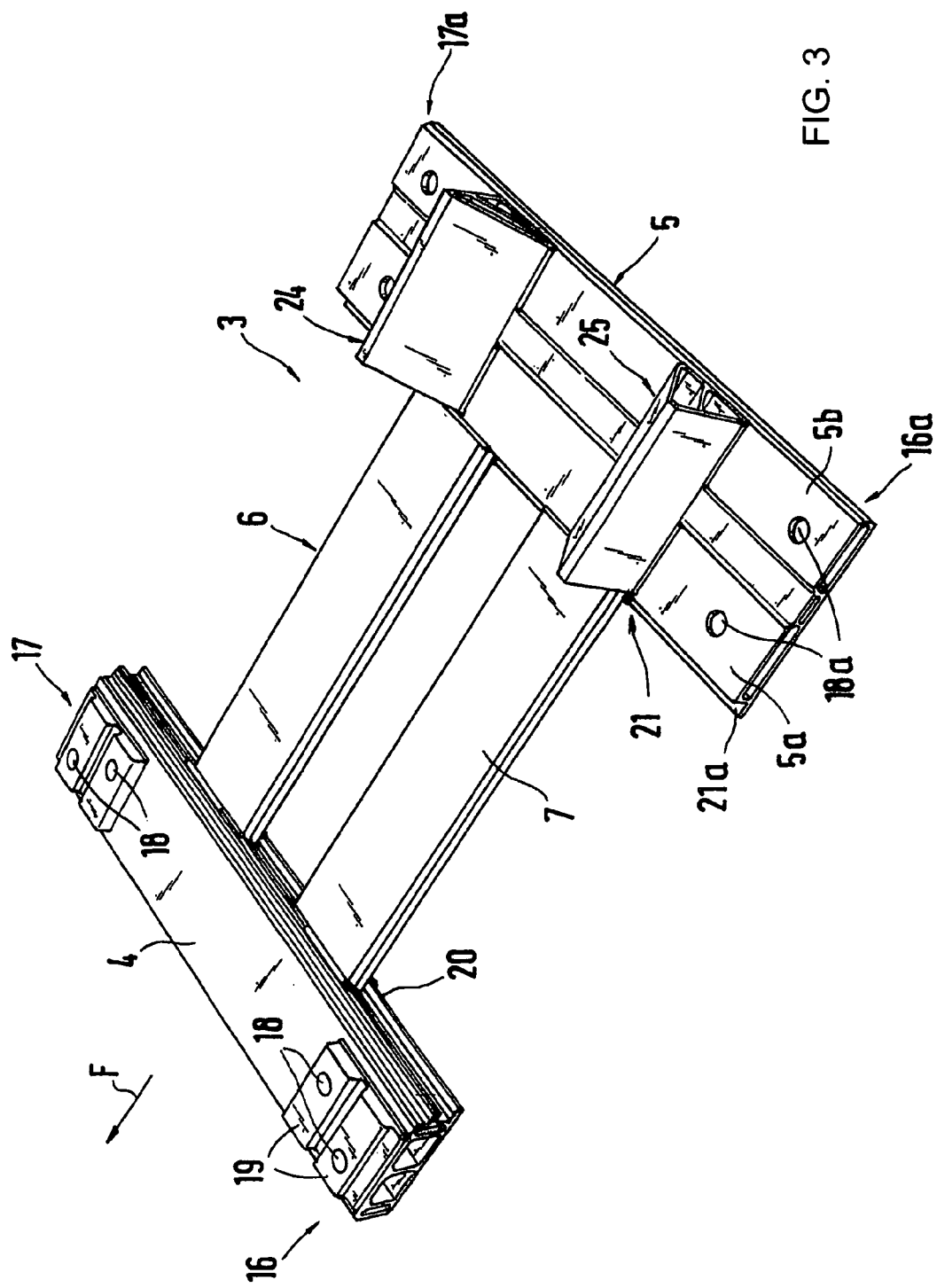
FIG. 3 shows a diagrammatic illustration of the tunnel bridge.
Figure 4:
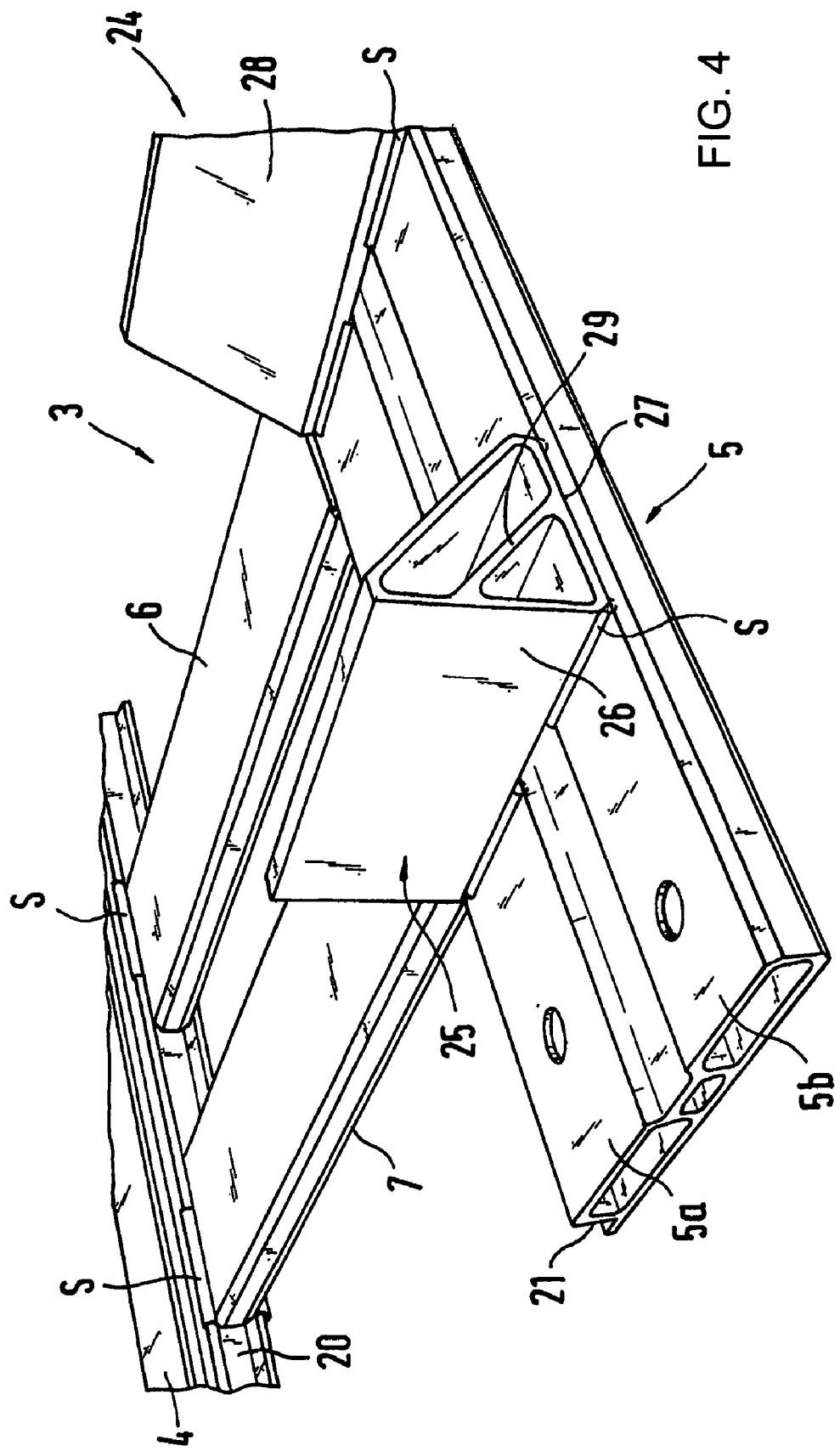
FIG. 4 shows a diagrammatic illustration of the rear region of the tunnel bridge with impact elements arranged on the rear transverse member.
Figure 5:
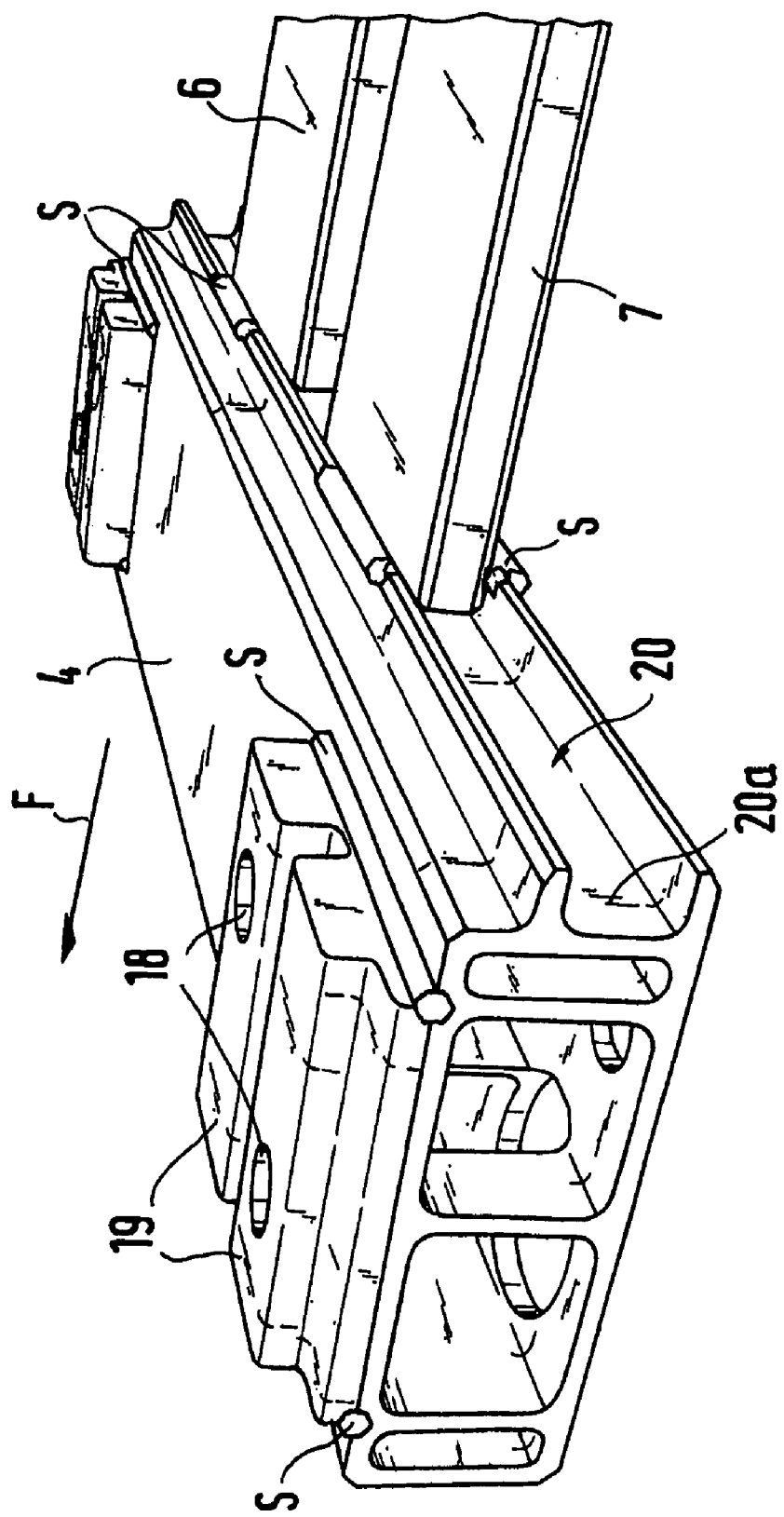
FIG. 5 shows a diagrammatic illustration of the front region of the tunnel bridge with reinforcement elements arranged on the transverse beams.

Referring now to the figures of the drawing in detail and first, particularly, to FIG. 1 thereof, a stiffening device for a vehicle body 8, having a central tunnel 2, which has a U-shaped profile in cross section and which is open in the downward direction, is composed of a tunnel bridge 3. The tunnel bridge 3 comprises at least two transverse beams 4, 5 and, connected thereto, longitudinal beams 6, 7 which form a supporting frame. The tunnel bridge 3 is connected to the vehicle body 8, in particular via the floor structure of the vehicle, by means of the transverse beams 4, 5. The tunnel bridge 3 is arranged at the rear end of the central tunnel 2—as viewed in relation to the forward travel direction F—with a connection to a transversely arranged heel plate carrier 10 and under bent portions 11, 12 of limb walls or side walls 13, 14 of the central tunnel 2.

The one forward transverse beam 4 of the tunnel bridge 3—as viewed in the direction of travel F—is connected to the vehicle body 8 between transverse seat carriers 15, 15a which are arranged at both sides of the central tunnel. For this purpose, connecting elements, for example screws, are provided at the free end 16, 17 of the transverse beam 4, which screws extend through bores 18 of the transverse beam 4 and attached reinforcement elements 19.

The transverse beam 5 which is arranged further toward the rear—as viewed in relation to the direction of travel F—is connected with a transverse section 5a to the vehicle body 8 in the region of the central tunnel 2 and a further transverse section 5b is fastened to the heel plate carrier 10 of the vehicle body 8. A connection takes place by screw means through bores 18a. According to a further refinement, the transverse beam 5 may also be arranged between transverse seat carriers of rear seats.

The two transverse beams 4, 5 bridge a downwardly open region of the central tunnel 2 which has a U-shaped profile in cross section, with the longitudinal beams 6, 7 being arranged, so as to lie freely, in or below the central tunnel 2 within said downwardly open region of said central tunnel 2. A connection of the longitudinal beams 6, 7 to the transverse beams 4, 5 takes place at the end side in outer receptacles 20, 21 of the transverse beams 4, 5. The connection may for example take place by means of a welded connection S.

The transverse beams 4, 5 and the longitudinal beams 6, 7 may be composed of extruded profiles which are formed so as to be hollow with inner reinforcement struts, wherein the outer receptacles 20, 21 may be formed as a groove 20a or with only one support web 21a.

The rear transverse beam 5 has, on its upper side, impact elements 24, 25 which bear in each case against the inside of the limb walls 13, 14. The impact elements 24, 25 are of triangular design as a profile in cross section, with an upright support wall 26 facing in each case toward the inner side of the limb wall 13, 14 and a fastening wall 27, which is arranged at right angles thereto, on the transverse beam 5, and being fastened thereto by means of a welded connection S. A reinforcement wall 27 which runs parallel to the connecting, obliquely-aligned inner wall 28 is arranged in the interior of the impact element 24, 25.

As illustrated in more detail in particular in FIG. 1 by arrows, in the event of a side-on crash from the left—as viewed in relation to the direction of travel F—in the region of the B pillar of the vehicle body 8, a force flow takes place for example via the transverse seat carrier 15, then via the tunnel bridge 3 or the forward transverse beam 4 to the further transverse seat carrier 15a on the other side of the central tunnel 2. In the event of a side-on crash from the left in the region of the rear transverse beam 5, the force flow takes place via the heel plate carrier 10 to the transverse beam 5 and subsequently back into the heel plate carrier 10, by means of which a connection of the transverse section 5b of the transverse beam 5 to the heel plate carrier 10 is formed.

The invention claimed is:

1. A stiffening device for a vehicle body of a motor vehicle, the vehicle body having a central tunnel with a U-shaped cross section and with sidewalls, wherein the central tunnel is connected by way of bent portions on the sidewalls to a floor panel of the vehicle body and wherein transverse seat carriers are disposed on both sides of the central tunnel and connected to the floor panel and to the central tunnel, the stiffening device comprising:
   a tunnel bridge disposed at an underside of the vehicle body facing toward the floor panel;
   said tunnel bridge including at least two transverse beams and longitudinal beams connected to said transverse beams;
   said transverse beams extending underneath the bent portions of the central tunnel in a vehicle transverse direction and having free ends to be fastened in each case to the vehicle body by connectors disposed in bores; and
   said transverse beams of said tunnel bridge including a rearward transverse beam, relative to a direction of travel, and said rearward transverse beam having, on an upper side, impact elements disposed as an extension of said longitudinal beams and lying in each case with a vertical support wall against an inside of the sidewalls of the central tunnel.

2. The stiffening device according to claim 1, wherein said tunnel bridge is disposed at a rear end of the central tunnel, relative to a forward direction of travel of the motor vehicle, with a connection to a transversely aligned heel panel.

3. The stiffening device according to claim 1, wherein said transverse beams of said tunnel bridge include a forward transverse beam, relative to the direction of travel, disposed between transverse seat carriers for front seats in a region of a B pillar of the motor vehicle and said rearward transverse beam, disposed between transverse seat carriers of rear seats or directly in front of a transversely arranged heel panel.

4. The stiffening device according to claim 1, wherein said two transverse beams are disposed to bridge an open region of the central tunnel, and said longitudinal beams are spaced apart from one another and disposed within or below the open region of the central tunnel.

5. The stiffening device according to claim 1, wherein said transverse beams are composed of a hollow and profiled extruded profile and said profile is formed with receptacles on an outside thereof for corresponding end faces of said longitudinal beams, and said longitudinal beams are connected to said transverse beams by way of welding.

6. The stiffening device according to claim 1, wherein said transverse beams of said tunnel bridge include a forward transverse beam, relative to a direction of travel, and said forward transverse beam has, on an upper side, reinforcement elements for fastening to the vehicle body, said reinforcement elements being disposed in each case on the free end of said transverse beam.

7. The stiffening device according to claim 1, wherein said impact elements have a triangular cross section, and said impact elements each include a horizontal fastening wall lying on and being connected to said transverse beam and said support wall extending at right angles to said horizontal fastening wall.

8. The stiffening device according to claim 1, wherein said transverse beams form a strength bond with said longitudinal beams, to define a positively-guided force flow via said longitudinal beams and/or said transverse beams in the event of a front-on crash and via said transverse beams and/or said longitudinal beams in the event of a side-on crash.

* * * * *